Nov. 5, 1968 S. L. ROBERTS Re. 26,482

SLUG INSERTER FOR LINE-CASTING MACHINES

Original Filed June 7, 1965 2 Sheets-Sheet 1

INVENTOR.
STUART L. ROBERTS
BY

ATTORNEY

Nov. 5, 1968 S. L. ROBERTS Re. 26,482

SLUG INSERTER FOR LINE-CASTING MACHINES

Original Filed June 7, 1965 2 Sheets-Sheet 2

INVENTOR.
STUART L. ROBERTS
BY

ATTORNEY

United States Patent Office

Re. 26,482
Reissued Nov. 5, 1968

26,482

SLUG INSERTER FOR LINE-CASTING MACHINES

Stuart L. Roberts, Anaheim, Calif., assignor of one-half to J. Richard Huffman, Anaheim, Calif.

Original No. 3,262,555, dated July 26, 1966, Ser. No. 461,691, June 7, 1965. Application for reissue July 25, 1966, Ser. No. 570,126

9 Claims. (Cl. 199—61)

Matter enclosed in heavy brackets [ ] appears in the original patent but forms no part of this reissue specification; matter printed in italics indicates the additions made by reissue.

*ABSTRACT OF THE DISCLOSURE*

*The slug inserter is arranged to be secured to a linecasting machine for the insertion of precast slugs into the line casting machine galley in proper serial relationship to the slugs cast by the line casting machine. This is accomplished by means of slug inserter and slug inserter control means. The slug inserter has a slug chute and has a blade which is stressed to discharge a slug from the chute into the line casting machine galley. A cam on the line casting machine elevator retracts the slug inserter blade when the elevator rises and the slug inserter blade is held in this cocked position by means of a lock means. The control means accepts a tape reader signal and delays release of the lock means until the line casting machine has performed enough linecasting operations so that the lock means is released at the correct point and the slug inserter is inserted by the slug inserter blade after the correct line produced by the line casting machine.*

This invention is directed to a slug inserter particularly adapted to be integrated with line casting machines and arranged to insert precast lines between lines cast by the line casting machine, on appropriate signal for an inserted slug.

Line casting machines are well known. Such line casting machines receive an input signal corresponding to each letter to be cast into a line of type. Upon receipt of the letter signal, a matrix is delivered from a hopper and the matrix is assembled with previous and subsequent matrices in a matrix line. The matrices are clamped to a fixed length and are spaced between words in the line to fill out the line space. Thereupon a line slug is cast thereagainst. The line slug is shaved at the end opposite the end cast against the matrices so that a proper line depth is established. A finished line slug results. The finished line slug has appropriate type faces cast thereupon corresponding to the input signal to the machine. This line slug is deposited in a chute which guides it into a galley at the front of the machine. Conventional machines for operating in this manner are well known.

Such machines have great utility when creating line after line of finished slugs. However, in those cases where separating material is required between slug lines, no provision is made on the machine to accomplish such results. Such separation may be in the form of line spacing, it may be in the form of a narrow rule which separates various items in the column of slugs, it may be in the form of a decorative border or rule, or it may be in the form of a pre-created line containing intelligible information.

Some prior line casting machines may be manually operated from a keyboard structure so that each letter input signal is successively indicated upon the keyboard. Other line casting machines are operated from punched tape signaling devices which are secured to the machine and connected to the keyboard so that various combinations of punched holes in a punched tape actuate an appropriately connected tape reader to cause the proper, orderly assembly of matrices. The tape reader signals the end of a line when a line is filled or when an item is complete. Such an end of the line signal, or an appropriate end of the line signal from another surce, rotates a cam structure which actuates appropriate switches for proper machine functioning. One of the functions is to begin the cyclic sequencing of the slug casting operation from the assembled matrices. Additional punched hole combinations are available for the signaling of insertion of additional slugs into the line casting machine galley independent of the line casting operation. Such operation is appropriately performed at the end of each line and signaled by the tape reader where such an additionally inserted slug is desired. Appropriate circuitry and signaling equipment is thus necessary to signal the insertion of the slug at the appropriate time in the machine cycle so that the inserted slug is inserted into the galley at the correct time as to be in the correct order.

Accordingly, it is an object of this invention to provide a slug inserter which is connectable to a line casting machine so as to insert preformed slugs between the cast slugs created by the line casting machine and to insert such slugs at the proper time so that they are assembled in proper place in the galley of the line casting machine.

It is a further object of this invention to provide a slug inserter for a line casting machine, which slug inserter can be signaled for slug insertion operations at the end of a line signal for casting to the line casting machine and an appropriate electrical circuit delays the insertion of the inserted slug until after the casting of the line which the slug is to follow.

It is a further object of this invention to provide a slug inserter for a line casting machine which slug inserter can be operated from a line casting tape reader so that an inserted slug can be appropriately signaled from a tape reader and inserted into the galley of the line casting machine between appropriately cast lines.

Other objects and advantages of this invention will become apparent from a study of the following portion of the specification, the claims and the attached drawings in which:

Figure 1:
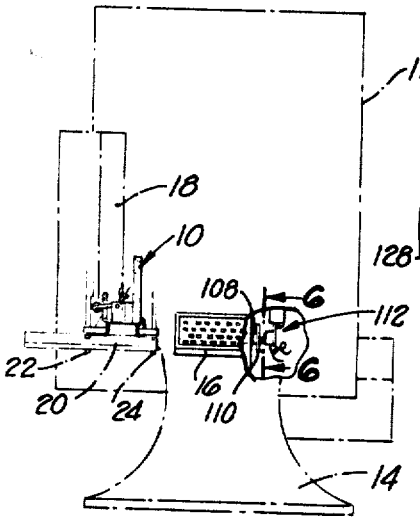
FIG. 1 is a front elevational view of a conventional line casting machine shown in dotted lines with the slug inserter of this invention shown in association therewith in full lines.

As an aid to understanding this invention it can be stated in essentially summary form that it is directed to a slug inserter for the insertion of preformed slugs into the arrangement of slugs cast in a line casting machine. The mechanical structure of the slug inserter comprises a slug chute in which the preformed slugs are inserted and stacked in the proper order. The bottom slug in the chute lies on a floor in front of an injector plate. The injector plate is spring urged for the injection operation which comprises thrusting the bottom slug off of the stack in the chute. After such ejection, the ejected slug is guided downwardly into the chute toward the galley so that it follows the regular cast type line. Guidance is such that it enters the galley stack behind the last cast type line. A cam on the elevator is followed by a cam follower operatively connected to the slug inserter slide. As the elevator descends to casting position, the cam follower can be permitted to be spring urged to follow the cam so that the inserter slide is actuated. However, a latching solenoid is mounted adjacent the inserter slide in such a manner that when the solenoid is not energized the inserter slide is restrained from moving through the injection cycle. Thus, the cam follower does not follow the descent of the cam.

It can be seen that control of slug insertion depends upon descension of the elevator to the casting position coupled with energization of the restraining solenoid. Electrical circuitry controls the energization of this solenoid. The input signal in either case can be either a key upon the line casting machine keyboard or can be a suitable signal from a punched tape reader. The circuitry is keyed to the machine cycle so that the slug inserter solenoid is not actuated until the machine cycle is such that the cast slug has been moved down into the galley.

This invention will be understood in greater detail by reference to the following portion of the specification wherein the drawings are described. Referring now to FIGS. 1 through 5, the slug inserter of this invention is generally indicated at 10. A line casting machine is shown at dotted lines at 12 in FIG. 1. The line casting machine 12 has a base 14 by which the machine 12 mounts upon the floor. Line casting machine 12 is of conventional construction and carries toward its upper end a series of chutes each carrying a different matrix. Actuation of an individual key upon keyboard 16 releases one of the matrices. After a sufficient number of matrices have been released, the group has sufficient length to make up a line of type. At that point elevator 18 rises from its intermediate to its upper transfer position and receives the group of matrices. The matrices are lowered by descent of the elevator 18 to its full lowered position. The matrices are then held to line length and the word spacers are expanded so that the matrices are firmly related in the stack. Molten metal is then cast against these matrices so that a cast line slug is formed. After line casting is complete, the elevator 18 moves upward to its intermediate position where the matrices are returned for distribution into the individual matrix chutes and the newly cast line slug moves into slug cooling position and the previously cast and cooled slug moves down the slug chute of the machine into galley 20. [In this sequence of operations it is important to note that the elevator 18 moves downward to line casting position between the deposit of newly cast line in galley 20, and to note the fact that it takes two machine cycles to bring out a particular cast line.]

Galley arms 22 and 24 are mounted on the front of the machine, one on each side of elevator 18. Slug inserter 10 is mounted upon galley arms 22 and 24 so as to be positioned at least partially in front of elevator 18 and so as to be related to the chute wherein the newly cast lines move down into galley 20. z Slug inserter 10 comprises base 26 which is provided with feet 28 and 30. Feet 28 and 30 are suitably inclined to match the angular orientation of galley arms 22 and 24 and are respectively secured to these galley arms. Base 26 has a horizontal central section 32 which carries longitudinal slots 34 and 36. Slug inserter frame 38 is mounted upon the top of central section 32. Screws 40 and 42 pass through slots 34 and 36 so as to make frame 38 slidably adjustable with respect to the central section 32. Upstanding front and rear walls 44 and 46 are mounted upon frame 38 to enclose a major part of the operating structure of slug inserter 10. The top of frame 38 defines floor 48 which carries guides 50 and 52.

Slidably mounted upon floor 48 and constrained to linear motion by guides 50 and 52 is slug inserter blade 54. Blade 54 has straight edges 56 and 58 which engage under guides 52 and 50 for rectilinear guidance of blade 54. Bifurcated boss 60 is mounted on top of blade 54 adjacent the rear edge thereof *which is at the left end as is seen in FIG. 2.*

Pin 62 is mounted between the arms of boss 60 and is arranged to extend transversely of blade 54. Drive shaft 64 is rotatably mounted in front and rear walls 44 and 46, adjacent the top thereof, and irrotatably carries drive arm 66. Drive arm 66 is slotted adjacent its lower end with slot 68 and engages over pin 62. Cam follower arm 70 is irrotatably mounted on the rear end of drive shaft 64 behind wall 46. Arm 70 carries cam follower roller 72 rotatably mounted adjacent its outer end. The entire structure of slug inserter 10 is mounted adjacent the front of elevator 18 so that roller 72 cooperates with cam 74 mounted upon the front of elevator 18.

Figure 2:
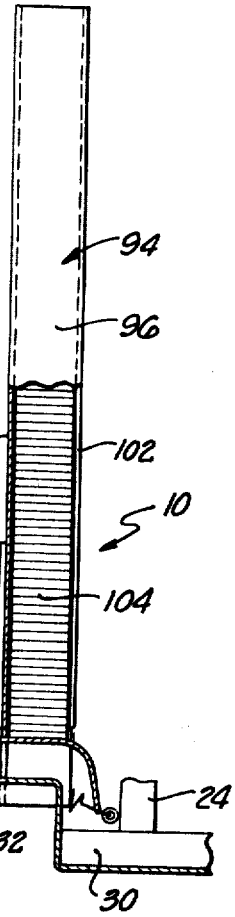
FIG. 2 is an enlarged front view, taken partly in section, showing the mechanical structure of the slug inserter of this invention.
Figure 3:
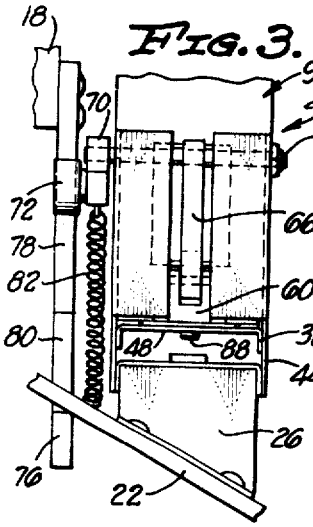
FIG. 3 is a left end elevational view thereof.
Figure 3:
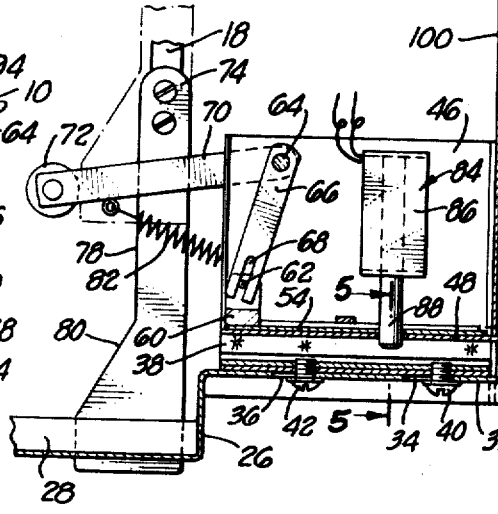
Figure 4:
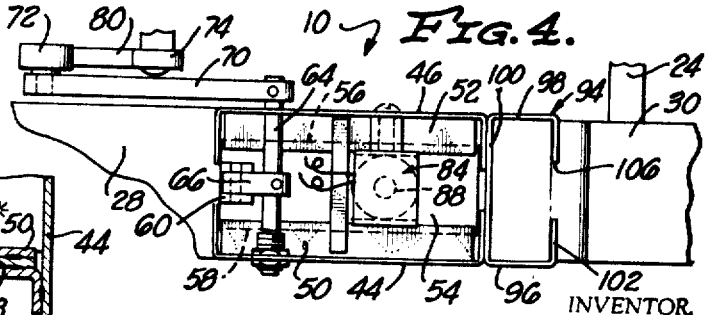
FIG. 4 is a top plan view thereof.
Figure 5:
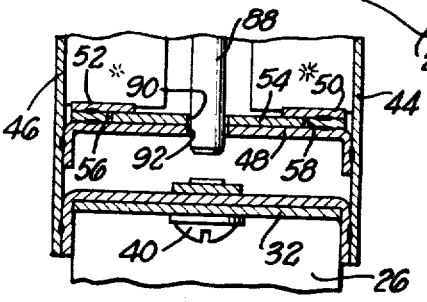
FIG. 5 is an enlarged partial section taken generally along the line 5—5 of FIG. 2.

Cam 74 has raised portion 76 which causes cam follower roller 72 to withdraw blade 54 to the position shown in FIG. 2. Cam 74 has recess portion 78 and transitional portion 80 which permits cam follower roller, in the absence of any other [restrain] *restraint* of the moving portion, to move blade 54 to the right. Spring 82 is connected between cam follower arm 70 and galley arm 24 behind the frame 38 to urge arm 70 in that direction. Thus, spring 82 urges arm 70 to act in a direction for slug insertion after cam follower roller *72* leaves raised portion 76.

Solenoid 84 has coil 86 and plunger 88. Solenoid 84 is mounted upon rear wall 46 and is positioned so that the plunger 88 can descend to a position below the top of blade 54. Opening 90 is located in blade 54 in alignment with plunger 88 when the blade 54 is in its leftmost position corresponding to the raised portion [78] *76* of cam 74 underneath cam follower roller 72. A corresponding opening 92 is formed in floor 48 so that when the openings 90 and 92 are aligned, and solenoid 84 is not energized, plunger 88 passes through openings 90 and 92 to restrain [bladeward] *rightward* motion of blade 54. By this means the cam follower roller 72 is maintained in the position shown in FIG. 2 even when the cam 74 moves to its lowered position, unless there is an appropriate energization of coil 86.

Secured to frame 38 and extending upwardly therefrom is slug chute 94. Slug chute 94 has front and rear walls 96 and 98, [back] *left* wall 100 and right wall 102. The rectangular opening between these walls is of suitable dimension for the acceptance of a stack of slugs 104 so as to suitably restrain them from horizontal displacement but permit them to descend gravitationally to the bottom *or discharge end* of slug chute 94. Right wall 102 has opening 106 throughout its entire height so as to aid in placement of slugs 104 within the chute. [Back] *Left* wall 100 terminates a sufficient distance above floor 48 so as to permit blade 54 to enter beneath slug chute 94. Right wall 102 terminates sufficiently above floor 48 to permit the lowermost slug 104 to be thrust off of the bottom of the stack of slugs 104 and *be discharged* out of slug chute 94. The stroke of blade 54 is sufficiently long so as to permit the blade to pass all the way through wall 102 so as to permit the full ejection of the bottommost slug 104 from slug chute 94. Floor 48 is curved downwardly, to the right of right wall 102 as seen in FIG. 2, so as to guide the ejected slug into proper position in the slug chute which carries freshly cast line slugs from the line caster 12 to the galley 20.

It is seen that [rightward] *leftward* motion of blade 54 is caused by the cam follower roller 72 being raised by the shape of the face of cam 74 as elevator 18 rises. Thus, the arm 70 is *in cocked condition* [cocked] when the elevator descends into a casting position and the arm is dropped for slug insertion only when coil 86 is energized. It is seen that ejection of the slug 104 from slug chute 94 and insertion of the slug 104 into the galley 20 thus depends upon energization of coil 86 so that an insertion can take place at the proper time, after the arm 70 is cocked by *the rising of the elevator, followed by* the elevator 18 descending to casting position.

The line casting machine 12 conventionally has a main cam shaft 108. The line casting machine is of such nature that the cam shaft 108 rotates 360 degrees for each line cast. Alternate molds are used in the machine to permit one line slug to be cast while the next earlier cast slug is solidifying. Mounted adjacent timing disc 110 are several switches generally indicated at 112. These switches are identified in further detail below.

Figure 6:
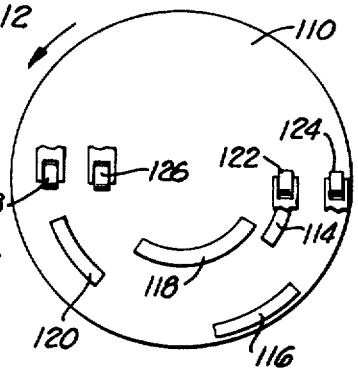
FIG. 6 is an enlarged partial elevational view with parts broken away taken generally along the line 6—6 of FIG. 1.

FIG. 6 illustrates in further detail the character of timing disc 110. Timing disc 110 has a generally flat front surface which is planar and is substantially perpendicular to the rotative axis of cam shaft 108. Cam surfaces 114, 116, 118 and 120 extend upward from the face of disc 110. Switches 112 are mounted adjacent timing disc 110 so that rollers 122, 124, 126 and 128 are respectively operated by the cam surfaces 114 through 120. Individual switch contacts are actuated by deflection of the rollers by means of the cam surfaces. Considering the position [108] of the cam shaft *108* shown in FIG. 6 to be the adverse position before the start of a casting cycle of the line casting machine 12, the roller 122 will be deflected upon revolution of timing disc 110 from 5 degrees to 35 degrees. In this situation roller 124 will be deflected from 45 degrees to 75 degrees. Similarly roller 126 will be deflected from 210 degrees to 300 degrees and roller 128 will be deflected from 305 degrees to 335 degrees.

Figure 7:
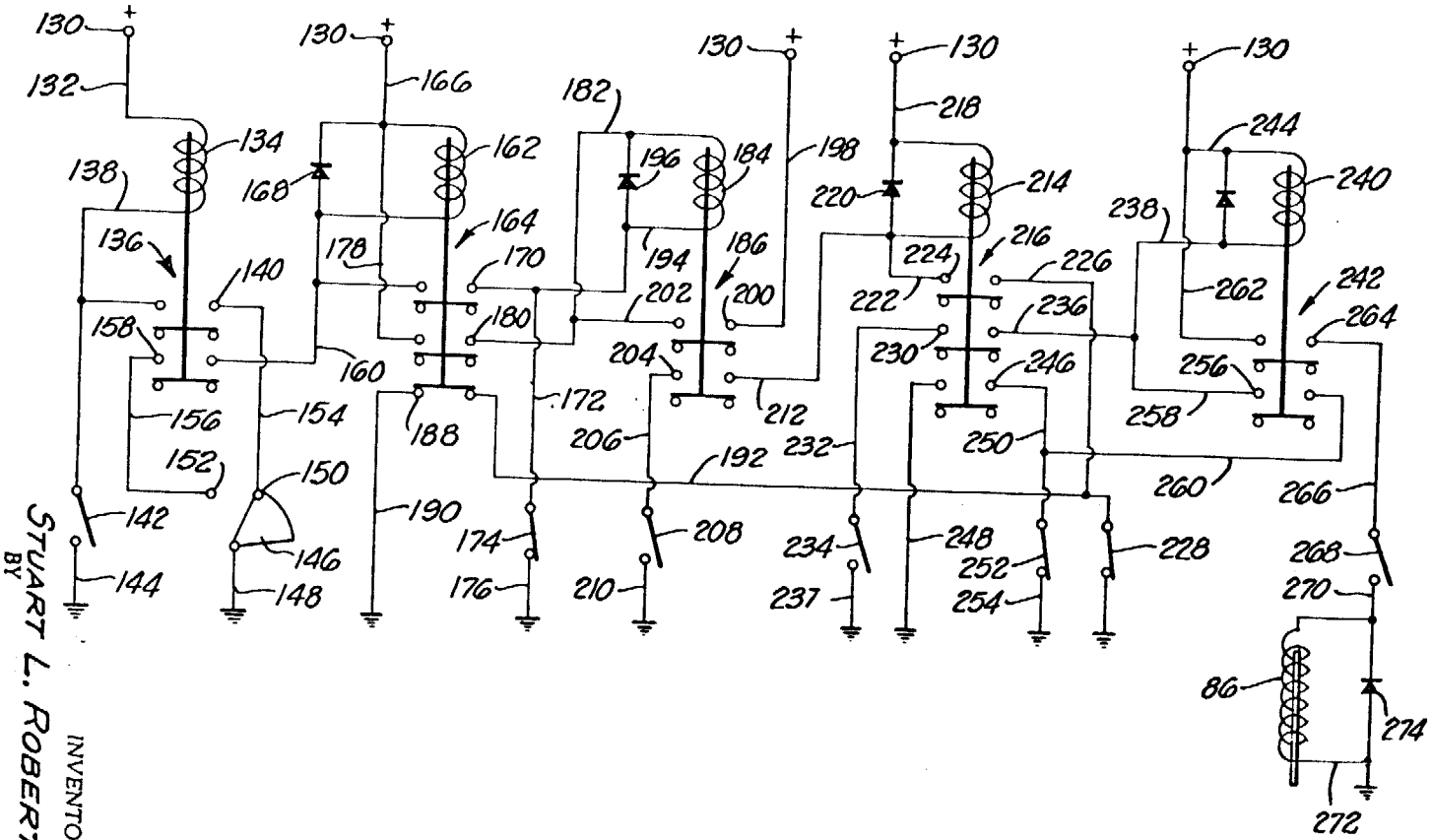
FIG. 7 is a schematic drawing of an electrical circuit used in connection with the slug inserter and the structure of FIG. 6.

Considering now the electric circuit of FIG. 7 which controls the operation of the aforedescribed structure, electric power of suitable voltage is supplied to points 130. Line 132 is connected to the electrical power source 130 and to one end of coil 134 of relay 136. Line 138 is connected to the other end of coil 134 and is also connected to normally open contact 140 and to switch 142. Switch 142 is connected to ground through line 144. Switch 146 is connected to ground through line 148 and is arranged to connect to either of contacts 150 or 152 and is arranged so that upon motion from one to the other of these contacts, both are connected together and to ground line 148 for a short time. Contact 150 is connected through line 154 to normally open contact 140 and contact 152 is connected through line 156 to normally open contact 158. The other side of coil 162 is connected by line 166 to power supply line 160 to one side of coil 162 of relay 164. The other side of coil 162 is connected by line 166 to power supply 130. Diode 168 is connected between lines 160 and 166. Line 160 is connected through normally open contact 170 to line 172 which is in turn connected to normally closed switch 174 which is connected through line 176 to ground. Line 166 is connected through line 178 through normally open contact 180 and thence through line 182 to one side of coil 184 of relay 186. Normally closed contacts 188 are connected on one side through line 190 to ground and to the other side to line 192.

Relay 186 has the other side of its coil connected through line 194 to line 172 and through diode 196 to line 182. Line 198 connects the power source 130 to normally open contacts *200* which are in turn connected *through* [to] line 202 to line 182. Normally open contacts 204 are connected through line 206 through normally open switch 208 and line 210 to ground. Normally open contacts 204 are also connected through line 212 to one side of coil 214 of relay 216. The other side of coil 214 is connected through line 218 to power source 130. Diode 220 is connected between lines 212 and 218. Line 212 is connected through line 222 to normally open contacts 224 and line 226 to line 192. Line 192 is connected through normally closed switch 228 to ground.

Normally open contacts 230 are connected through line 232 and normally open switch 234 and line [236] *237* to ground. The other side of contacts 230 is connected through line 236 and line 238 to one side of coil 240 of relay 242. The other side of coil [242] *240* is connected to power through line 244. Normally open contacts 246 of relay 216 are connected on one side to ground through line 248 and are connected on the other side to line 250. Line 250 is in turn connected through normally closed switch 252 and line 254 to ground. Normally open contacts 256 of relay 242 are connected through line 258 to line 238 and are connected through line 260 to line 250.

Line 262 is connected to the power supply 130 and through normally open contacts 264 and line 266 to normally open contacts *200* which are in turn connected 268 to coil 86. Coil 86 is connected to ground through line 272. Diode 274 is connected between lines 270 and 272.

Switches 208 and 228 are controlled by the operation of roller 122, see FIG. 6, by cam surface 114. The normal condition for these switches is the "unactuated by the cam surface" condition. Switch [178] *174* is controlled by roller 124. Switch 268 is controlled by roller 126 and switches 234 and 252 are controlled by roller 128.

Switch 142 is directly operated by the appropriate fingers in the tape reader device which reads the signal that a slug should be inserted at the end of the line just then having been signaled by tape perforations. Alternatively, switch 142 can be a manual switch on or adjacent the keyboard. The former is desirable when the type casting machine is tape operated, and the latter is preferable when it is keyboard operated. Switch 146 is a switch operated by the end of the line cam in the tape reader on the machine. It signals when the line casting machine is performing its end of the line cycling. The cam shaft operates this switch when an end of the line signal is read and when the elevator of the line casting machine is ready for a new group of matrices. Closure of switch 142 energizes coil 134 to close contacts 140. Contacts 140 serve as holding contacts for relay 136. Relay 136 is held energized until the end of the line cam shaft operates. As switch blade 146 moves it touches contact 152 which permits the connection of line 160 to ground through now closed contacts 158. Thus, coil 162 is energized when the switch plate 146 signals the end of the line operation. Motion of blade 146 to contact 152 opens the holding circuit through contacts 140 and switch contact 150 so that relay 136 drops out when the motion of blade 146 is completed to contact 152. Holding of coil 162 is accomplished through normally open contacts 170 and normally closed switch 174 operated by roller 124. The energization of coil 162 closes contacts 180 which energizes coil 184 of relay 186. Holding of relay 186 is accomplished through now closed normally open contacts 200. This is the state of affairs as the timing disc 110 starts rotating. Switch 208 is closed and switch 228 is opened from 5 to 35 degrees of rotation of timing disc 110. At the closure of switch 208, coil 214 is energized through now closed contacts 204 for the energization of relay coil 214. Relay 216 is held in at the end of the actuation by cam 114 because switch 228 is closed at the same time that switch 208 is opened and diode 220 maintains current flow in coil 214 sufficiently long to hold it engaged. Thus, holding of relay 216 is accomplished through switch 228. At 45 degrees switch 174 is opened so that relay 164 is dropped out. When it drops out, relay 186 also drops out. The energization of relay 216 holds the memory for later energization of relay 242. At 210 to 300 degrees switch 268 is closed but nothing happens because contacts 264 are open. At 305 to 335 degrees switch 234 is closed and switch 252 is open. With the closure of switch 234, and the now closed contacts 230, coil 240 is energized. This energization closes contacts 256 for holding of relay 242 through line 260. At the same time contacts 256 are closed so that coil 240 is held through now closed contacts 246. Upon closure of switch 252 holding of coil 240 is accomplished through that circuit.

By this circuitry, the memory for slug insertion is held. On the next machine cycle, switch 228 is first opened, dropping out relay 216. Cycling continues, with a new slug insertion signal coming through the relays, or without, depending on slug insertion requirements. However, when the cycle proceeds to the point where switch 268 is closed, slug insertion takes place by energization of coil 86. Furthermore, the circuit is ready to handle the signal for insertion of a slug, or not, depending on actuation of switch 142.

This invention having been described in its preferred embodiment, it is clear that it is susceptible to numerous modifications and changes within the scope of the invention and without the exercise of the invention faculty. Accordingly, the scope of this invention is defined by the scope of the following claims.

I claim:

1. A slug inserter for a line casting machine having [alternatively operating] a line casting [molds] *mold*, an elevator, a slug guide and a galley, said slug inserter comprising:

a slug chute adapted to carry a plurality of slugs [adapted] to be placed between lines cast by the line casting machine, said slug chute having a [top and a bottom] *discharge end* and being arranged so that slugs positioned therein are [gravitationally] moved toward the [bottom] *discharge end* of said slug chute, a slug inserter blade positioned in said slug inserter, said slug inserter blade being adapted to engage the [bottom] slug in the slug chute *closest its discharge end* and eject [the bottom] *that* slug therefrom into the slug guide of the line casting machine and thence into the galley thereof, said slug inserter blade having first and second control means associated therewith;

said first control means comprising a cam follower mechanically connected to said slug inserter blade, said cam follower being spring urged in a direction to eject the [bottom] slug *to be discharged* from the slug chute of said slug inserter, a cam adapted to be secured to the elevator on the line casting machine, said cam having cam surfaces engageable with said cam follower so as to move said cam follower in such a direction as to move the inserter blade away from its insertion direction when the elevator is raised and so as to [permit] *release* said inserter blade to move in its insertion direction when the elevator is in its casting position;

said second slug inserter blade control means comprising locking means arranged to lock said blade in a position away from its slug insertion position;

electrical control means connected to said second slug inserter blade control means, said electrical control means comprising signal means adapted to be actuated to signal the insertion of a slug after the casting of the line just signaled to be cast to the line casting machine and electrical delay means connected between said slug insertion signaling means and said second blade control means so that *said* second control means *lock said blade in a position away from its slug insertion position;* [is inoperative] until after the line casting machine emits the appropriate cast line down the slug guide of said line casting machine into its galley and then [permits the actuation of] *releases* said second control means so that said spring urged [first control means] *slug inserter blade* ejects a slug from the slug chute of said slug inserter into the slug guide of the line casting machine and thence into the galley to follow the appropriate cast line from the line casting machine.

2. The slug inserter of claim 1 wherein said electrical [circuit] *control means* connected to control said second control means includes a switch operated by the line casting machine so that said switch is closed during a portion of the line casting cycle of the line casting machine.

3. The slug inserter of claim 2 wherein said second control means is a solenoid, said solenoid having a movable plunger, said movable plunger being movable from a position wherein it locks said slug inserter blade to a position where it unlocks said slug inserter blade so that said slug inserter blade inserts a slug.

4. The slug inserter of claim 3 wherein said slug inserter is carried upon first and second feet, said first and second feet being adapted to be secured to the galley arms of the line casting machine so that the slug inserter is adjacent the galley on the line casting machine.

5. A slug inserter for a line casting machine which casts lines in alternate molds and which has a main cam shaft, a newly cast line guide and a galley, said slug inserter comprising:

a chute having a top and a bottom and adapted to carry slugs to be inserted between the lines cast by the line casting machine and arranged so that the slugs are gravitationally moved toward the bottom of said slug chute, a reciprocable slug inserter blade in said slug inserter, said blade being positioned to move from a first position away from said slug chute to a second position past said slug chute, said blade having a front end and arranged so that as said blade moves from its first position to its second position said front end thereof moves across the bottom end of said slug chute to eject a slug therefrom, guides in said slug inserter to guide said blade in its reciprocable movement, first and second control means arranged with respect to said blade so as to control said blade;

said second control means comprising electrically controlled locking means arranged to retain said blade in its first position;

said first control means comprising a cam adapted to be mounted on the elevator of the line casting machine, a cam face on said cam, a cam follower connected to said blade and arranged to be actuatable by said cam, said cam moving said blade to its first position when said elevator moves to its elevated position, said second control means retaining said blade in its first position while said elevator descends so that said cam face leaves said cam follower, a spring connected to urge said blade from its first position to its second position so as to move said blade to inject a slug and so as to move said cam follower toward said cam face;

electrical circuit means for controlling said second control means, said electrical circuit means comprising at least one electrical switch, a cam adapted to be mounted on the main cam shaft of the line casting machine, said cam being arranged so that said switch is closed during a portion of the line casting cycle of said line casting machine, input signaling means for signaling the insertion of a slug after the line just signaled to the line casting machine for casting, delay means in said electric circuit for delaying the actuation of said second control means until the line casting machine has deposited two lines in the galley thereon so that said second control means is actuated for insertion of a slug to insert the slug between correct lines.

6. The slug inserter of claim 5 wherein said electric control circuit comprises signal input means, signal advancing means to advance the insertion signal to a further portion of said circuit, and memory means to hold the signal until the correct time of insertion, said electric control circuit being arranged so that said signal input means can indicate the insertion of a slug while said memory means retains a slug insertion signal for insertion of a slug.

7. The slug inserter of claim 6 wherein said electrical control circuit comprises a plurality of relays interconnected to each other and a plurality of switches actuated by said cam, said relays being arranged so that energization of one of said relays indicates actuation of said second control means at a future line casting cycle while energization of said last relay indicates actuation of said second control means at the next line casting machine cycle.

8. A slug inserter adapted to be attached to a line casting machine which is arranged to cast type lines in alternate molds and which has an elevator, a newly cast line guide and a galley mounted upon galley arms, said slug inserter comprising:

a base, feet on said base, said feet being adapted to be mounted on the galley arms of the line casting machine so that said slug inserter is located adjacent the galley thereon, a slug chute mounted upon said base, said slug chute having a top and a bottom and adapted to carry slugs therein so that gravitational force moves slugs toward the bottom of said slug chute, said slug chute having an open wall for ready access to the slugs therein, guides in said base, a slug inserter blade reciprocably mounted within said guides and movable from a first position to a second position, said blade having a front edge which moves beneath said slug chute upon movement of said blade from said first position to said second position so as to eject a slug from the bottom of said slug chute into the slug guide;

first and second control means mounted on said base and associated with said blade;

said first control means including a cam follower, a cam adapted to be mounted on the elevator of said line casting machine, said cam having cam surfaces thereon adapted to act upon said cam follower, said cam follower being connected to said blade and arranged so that when said cam is in an elevated position due to an elevated position of the elevator, said cam follower retains said blade in said first position, a drive shaft mounted on said base, a cam follower arm mounted upon said drive shaft, said cam follower being mounted on said cam follower arm, a drive arm mounted upon said drive shaft, said drive arm being connected to said blade so as to move said blade upon movement of said cam follower;

a spring connected to said cam follower arm so as to urge said cam follower arm to move said blade from said first position to said second position;

said second control means comprising a solenoid mounted on said base, said solenoid having a movable plunger therein, a hole in said blade aligned with said plunger when said blade is in its first position so that when said blade is in said first position and said solenoid is unactuated, said plunger extends through said hole in said blade to maintain said blade in said first position;

an electrical control circuit connected to said solenoid for controlling the energization of said solenoid, first and second input signal means connected to said control circuit, said first input signal means comprising signal means indicating the need for a slug inserter actuation after the line caster delivers the line to the galley which resulted from the next previous line casting signal, said second signal means comprising first, second, third and fourth electric switches, cam means adapted to be mounted upon the cam shaft of the line casting machine, said cam means being arranged to close each of said switches once every line casting cycle of the line casting machine, a first relay actuated by said first signal, a second relay actuated by energization of said first relay, said second relay being connected to said first electric switch so as to be controlled by a cycle of the line casting machine, a third relay controlled by said second relay and by said second cam controlled switch, a fourth relay controlled by said third relay and by said third cam control switch, said solenoid being controlled by said fourth relay and by said fourth cam control switch, said switches being arranged so that said solenoid may be energized by actuation of said fourth switch while said first relay is ready to accept another slug insertion signal, said circuit being arranged so that said solenoid is actuated after two lines have been delivered by the line casting machine into the galley after the original actuation of said input signal.

*9. A slug inserter for a line casting machine having a line casting mold, an elevator, a slug guide and a galley, said slug inserter comprising:*

*a slug chute arranged to carry a plurality of slugs to be placed between lines cast by the line casting machine, said slug chute having a discharge end and being arranged so that slugs positioned therein are moved toward the discharge end of said slug chute, a slug inserter blade positioned in said slug inserter, said slug inserter blade being positioned to engage the slug in the slug chute at the discharge end and eject that slug therefrom into the slug guide of the line casting machine and thence into the galley thereof, said slug inserter blade having first and second control means associated therewith;*

*said first control means comprising a cam follower mechanically connected to said slug inserter blade, said cam follower being spring urged in a direction to eject the slug to be discharged from the slug chute of said slug inserter, a cam arranged to be secured to the elevator on the line casting machine, said cam having cam surfaces engageable with said cam follower so as to positively move said cam follower in such a direction as to move the inserter blade away from its insertion direction when the elevator is raised and so as to release said inserter blade to move in its insertion direction when the elevator is in its casting position;*

*said second slug inserter blade control means comprising locking means arranged to lock said blade in a position away from its slug insertion position;*

*ejection control means connected to said second slug inserter blade control means, said ejection control means causing actuation of said second control means so that said slug inserter blade ejects a slug from the slug chute of said slug inserter into the slug guide of the line casting machine and thence into the galley.*

References Cited

The following reference, cited by the Examiner, are of record in the patented file of this patent or the original patent.

UNITED STATES PATENTS

| | | | |
|---|---|---|---|
| 700,288 | 5/1902 | Bancroft et al. | 199—95 |
| 744,102 | 11/1903 | Proulx | 199—61 |
| 980,998 | 1/1911 | Pierpont | 199—95 |
| 2,180,410 | 11/1939 | Geissel | 199—61 |
| 2,801,734 | 8/1957 | Schuba | 199—61 |
| 2,872,026 | 2/1959 | Larson | 199—61 |
| 3,021,940 | 2/1962 | Fan | 199—61 |
| 3,071,241 | 1/1963 | Coffield et al. | 199—61 |

ROBERT E. PULFREY, *Primary Examiner.*

E. T. WRIGHT, *Assistant Examiner.*

UNITED STATES PATENT OFFICE

CERTIFICATE OF CORRECTION

Reissue No. 26,482 November 5, 1968

Stuart L. Roberts

It is certified that error appears in the above identified patent and that said Letters Patent are hereby corrected as shown below:

Column 5, line 39, "coil 162 is connected by line 166 to power supply" should read -- the normally open contact 158 is connected through --. Column 6, line 5, "contacts 200 which are in turn connected" should read -- switch 268. Line 270 is connected from switch --.

Signed and sealed this 10th day of March 1970.

(SEAL)
Attest:

Edward M. Fletcher, Jr.
Attesting Officer

WILLIAM E. SCHUYLER, JR.
Commissioner of Patents